May 18, 1926.

J. S. CHILTON

MANURE DISTRIBUTOR

Filed Nov. 3, 1924

Inventor

Jasper S. Chilton

By

Attorney

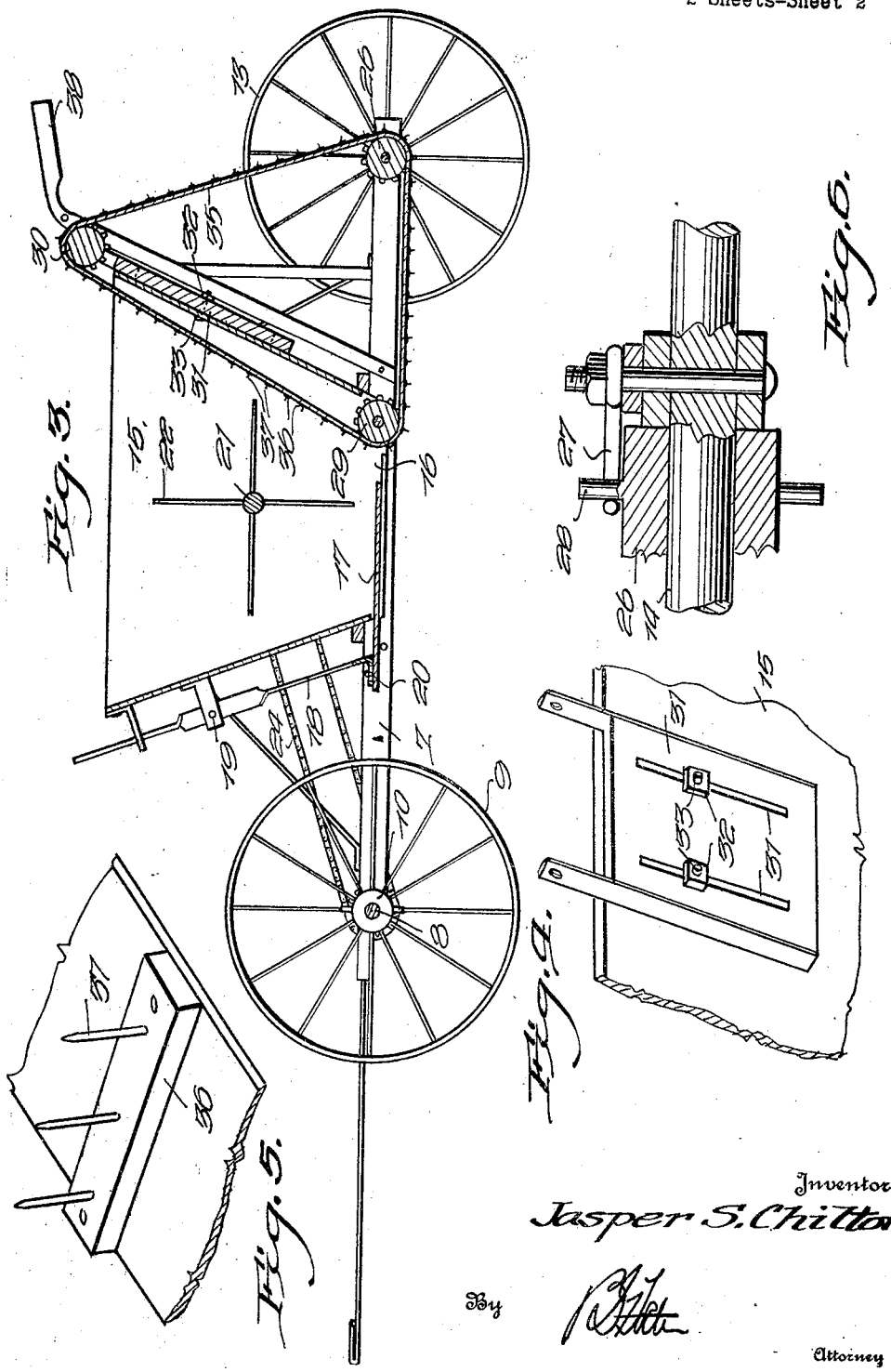

Patented May 18, 1926.

1,585,020

UNITED STATES PATENT OFFICE.

JASPER S. CHILTON, OF ARARAT, NORTH CAROLINA.

MANURE DISTRIBUTOR.

Application filed November 3, 1924. Serial No. 747,518.

The present invention relates more particularly to distributors for manure, and the object is to provide effective means for delivering the fertilizer evenly into a furrow or the like as the distributor moves over the ground.

The preferred embodiment of the invention is illustrated in the accompanying drawings, wherein:—

Figure 3 is a vertical longitudinal sectional view,

Figure 4 is a detail perspective view of an adjustable mounting for the upper roller of the feed belt, Figure 5 is a detail perspective view of a section of the feed belt, Figure 6 is a detail sectional view illustrating the connection between the rear axle shaft and pulley for the belt.

Figure 1:
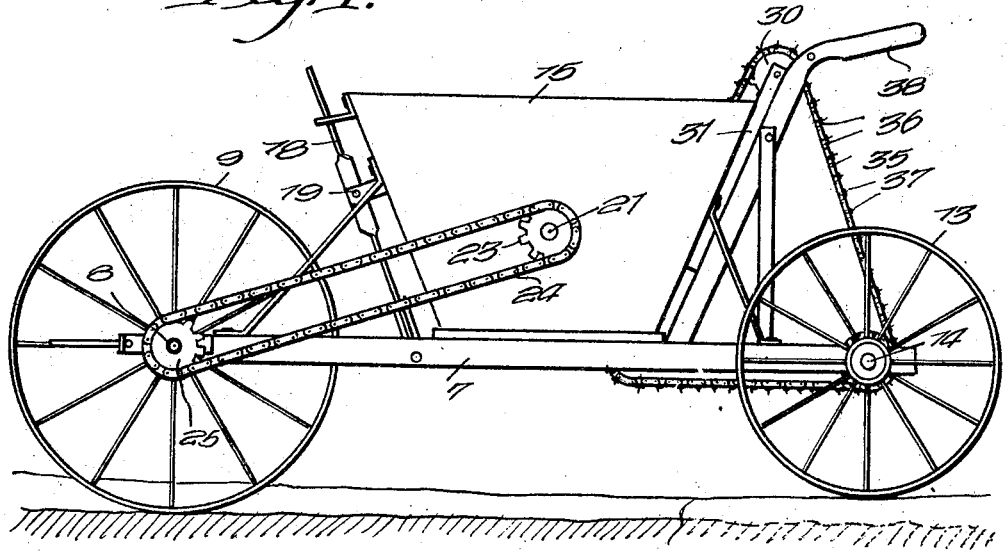
Figure 1 is a side elevation of the same.
Figure 2:
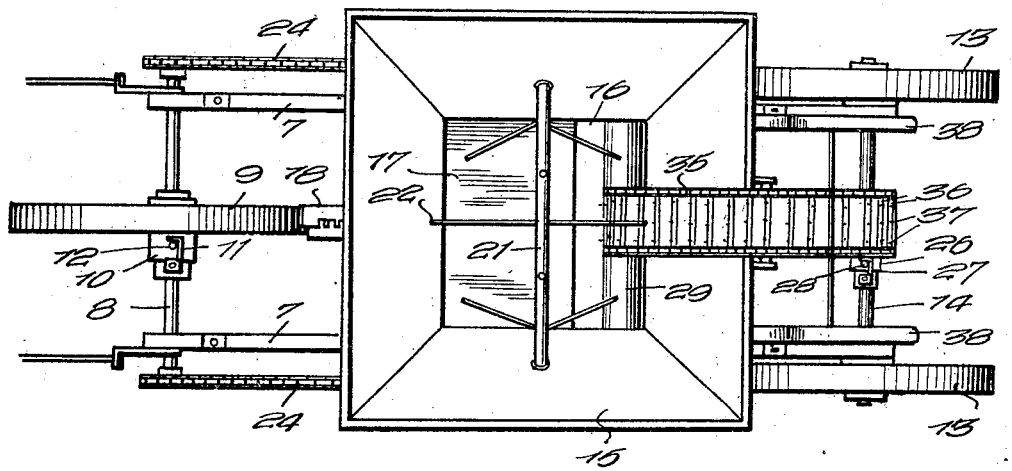
Figure 2 is a top plan view.

In the embodiment disclosed, a suitable frame is employed, including longitudinal side bars 7. A shaft 8, mounted on the front ends of said bars, carries a front wheel 9 that is located centrally between said bars. The wheel preferably has a hub 10 that is loose on the shaft 8, but it may be fixed thereto by any suitable means, as for example, a hook 11 carried by the shaft 8 and engaging over a pin 12 projecting from the hub 10. The rear end of the frame is supported by wheels 13 fixed to an axle shaft 14 journaled on the rear ends of the side bars 7.

A container, preferably in the form of a hopper or box 15 is supported on the frame between the front and rear wheels, and has an open bottom 16, the size of which can be varied by a sliding valve plate 17 mounted in the lower end of the container. This valve plate is operable by any suitable means, as for example, a lever 18 fulcrumed at 19 on the front of the container, and having a suitable loose connection 20 at its lower end with the projecting end of the slide valve. An agitator is located in the container, and comprises a shaft 21 extending across said container and carrying a plurality of radial agitating fingers 22. Both ends of this shaft are provided with sprocket wheels 23, around which passes an endless sprocket chain 24 that passes around another sprocket wheel 25 fixed to the axle shaft 8. It will thus be evident that when the machine is propelled, and it is drawn along a furrow and the wheel 9 is hooked to the axle shaft 8, the agitator will be rotated.

The rear axle shaft 14 has loosely mounted thereon a pulley 26 that is adapted to be secured so as to be rotated by said axle shaft through the medium of a hook 27 fixed to the axle shaft and detachably engaging with a pin 28 carried by the pulley. A pulley 29 is journaled beneath the lower rear portion of the open bottom of the container 15, and a third pulley 30 is journaled on a mounting plate 31 vertically adjustable on the rear side of the container 15. The plate 31 is held by clamping nuts 32 on bolts 33 that project through slots 34 in said clamping plate. Passing around the three pulleys 26, 29 and 30 is an endless belt 35, the tension of which can obviously be changed by adjusting the plate 31. This belt is provided with cross bars 36 having projecting spike teeth 37 and one stretch of the belt, as clearly shown in Figure 3, moves downwardly through the rear portion of the container 15 and out through the bottom of the same. Suitable handles 38 are provided and are located on opposite sides of said belt.

With this construction, when the distributor is drawn forwardly along a furrow, it will be evident that the spikes 37 of the belt will carry the fertilizer downwardly out of the same and that it will be deposited in the furrow, in an even supply. The agitator keeps the mass loose and breaks it up so that the belt will be properly supplied and the amount can be readily controlled by shifting the slide valve 17.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

What I claim is:

1. In a manure spreader, the combination with a hopper having a rear wall and a bottom opening, of an endless distributing belt that extends upwardly in rear of the rear wall, over the same, downwardly in front of said rear wall and through the bottom opening, thence rearwardly of said rear wall, and means for supporting the hopper, including wheels in rear of the hopper having driving connections with the belt to move the same downwardly in front of the hopper's rear wall and through the bottom opening.

2. In a manure spreader, the combination with a hopper having a rear wall and a bottom opening, of an endless distributing belt that extends upwardly in rear of the rear wall, over the same, downwardly in front of said rear wall and through the bottom opening, thence rearwardly of said rear wall, and means for supporting the hopper, including wheels in rear of the hopper, and a shaft carrying the wheels and having a gear around which the endless belt passes and by which it is driven.

In testimony whereof, I affix my signature.

JASPER S. CHILTON.